(12) United States Patent
Inaba

(10) Patent No.: US 10,831,038 B2
(45) Date of Patent: Nov. 10, 2020

(54) STEREO VIEWER AND/OR STEREO VIEW FINDER

(71) Applicant: Minoru Inaba, Oyama (JP)

(72) Inventor: Minoru Inaba, Oyama (JP)

(*) Notice: Subject to any disclaimer, the term of this patent is extended or adjusted under 35 U.S.C. 154(b) by 0 days.

(21) Appl. No.: 15/554,836

(22) PCT Filed: Mar. 10, 2015

(86) PCT No.: PCT/JP2015/057045
§ 371 (c)(1),
(2) Date: Aug. 31, 2017

(87) PCT Pub. No.: WO2016/143076
PCT Pub. Date: Sep. 15, 2016

(65) Prior Publication Data
US 2018/0052331 A1    Feb. 22, 2018

(51) Int. Cl.
*G02B 27/22* (2018.01)
*G02B 30/34* (2020.01)
(Continued)

(52) U.S. Cl.
CPC ............. *G02B 30/34* (2020.01); *G02B 30/37* (2020.01); *G03B 17/02* (2013.01); *G03B 17/561* (2013.01);
(Continued)

(58) Field of Classification Search
CPC .. G02B 27/2257; G02B 27/22; G02B 27/027; G02B 27/028; G02B 27/2228;
(Continued)

(56) References Cited

U.S. PATENT DOCUMENTS 3,884,551 A * 5/1975 Bernier .............. G02B 27/2228
                                                          359/475
5,486,841 A * 1/1996 Hara ........................ G02B 7/12
                                                              345/8

(Continued)

FOREIGN PATENT DOCUMENTS

JP    10-500493    1/1998
JP    2000111833   4/2000
(Continued)

OTHER PUBLICATIONS

Machine translation of Ansay, DE 102015000354 A1, Jul. 21, 2016 (Year: 2016).*

(Continued)

*Primary Examiner* — Balram T Parbadia
(74) *Attorney, Agent, or Firm* — Fattibene and Fattibene LLC; Paul A. Fattibene

(57) ABSTRACT

To provide a stereo viewer and/or a stereo view finder that enables a stereo image displayed on an electronic display to be easily visualized and to enhance portability so as to be easily and conveniently carried when photographing and viewing the stereo image outside. There is provided a stereo viewer/stereo view finder (1) including a foldable light shielding hood (10) attached on a liquid crystal display (D), and a magnifying lens (20) including a pair of lenses (21R, 21L) for viewing stereo images (SR, SL) and a lens folder (22), the magnifying lens being attached to a front inner wall surface (11a) of the light shielding hood (10) by way of a hinge (23) and being developable to be parallel to the liquid crystal display (D).

18 Claims, 13 Drawing Sheets

(51) Int. Cl.
*G03B 35/18* (2006.01)
*G02B 30/37* (2020.01)
*G03B 17/02* (2006.01)
*G03B 17/56* (2006.01)
*G03B 19/16* (2006.01)
*G02B 27/01* (2006.01)
*G02B 7/12* (2006.01)
*G02B 7/06* (2006.01)

(52) U.S. Cl.
CPC ............. *G03B 19/16* (2013.01); *G03B 35/18* (2013.01); *G02B 7/06* (2013.01); *G02B 7/12* (2013.01); *G02B 2027/0136* (2013.01); *G03B 17/566* (2013.01)

(58) Field of Classification Search
CPC ...... G03B 11/046; G03B 35/00; G03B 35/18; H04N 13/344
See application file for complete search history.

(56) References Cited

U.S. PATENT DOCUMENTS

| | | | | |
|---|---|---|---|---|
| 5,499,136 | A | 3/1996 | Jones | 359/474 |
| 5,879,064 | A * | 3/1999 | Inaba | G03B 21/64 353/7 |
| 5,978,015 | A * | 11/1999 | Ishibashi | G03B 35/08 348/47 |
| 7,493,037 | B2 | 2/2009 | Inaba | 396/324 |
| 9,405,126 | B1 * | 8/2016 | Margolin | G02B 27/2257 |
| 2011/0298900 | A1 * | 12/2011 | Inaba | G02B 27/2264 348/47 |
| 2014/0009828 | A1 * | 1/2014 | Plotkin | G02B 30/37 359/474 |

FOREIGN PATENT DOCUMENTS

| | | |
|---|---|---|
| JP | 2004177431 | 6/2004 |
| JP | 2006303832 | 11/2006 |
| WO | WO 2011/008133 | 1/2012 |

OTHER PUBLICATIONS

Machine translation of Tanaka, JP 2000111833 A, Apr. 21, 2000 (Year: 2000).*

Examiner provided machine translation of Togo (2012/008133 A1) (Year: 2012).*

International Search report dated Apr. 7, 2015 in PCT/JP2015/057045; 4 pages, with English translation.

* cited by examiner

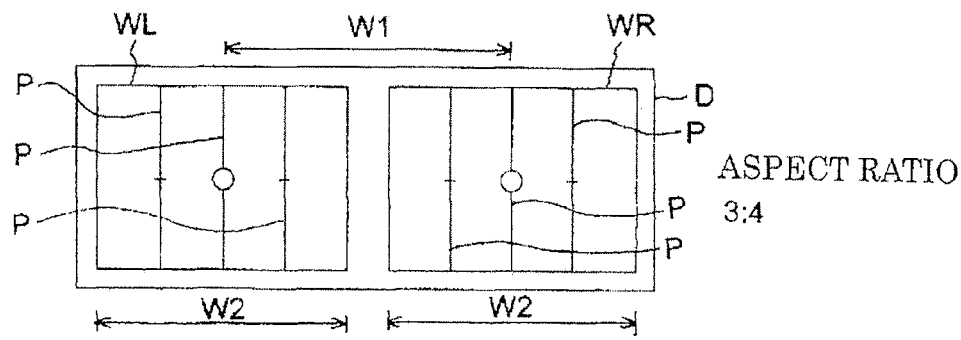
FIG. 3a  ASPECT RATIO 3:4
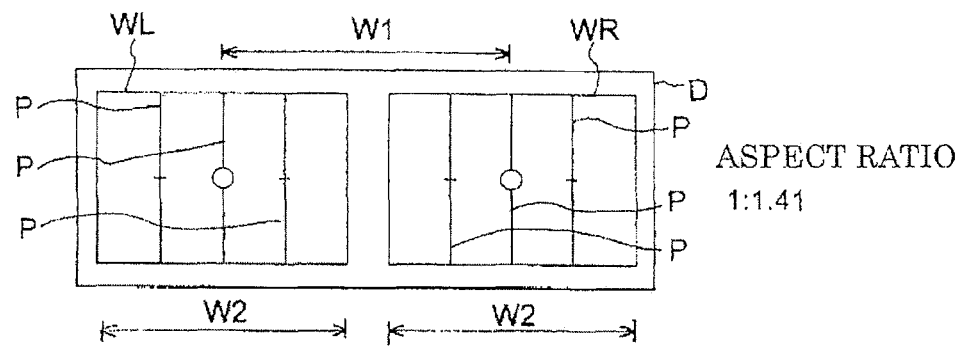
FIG. 3b  ASPECT RATIO 1:1.41
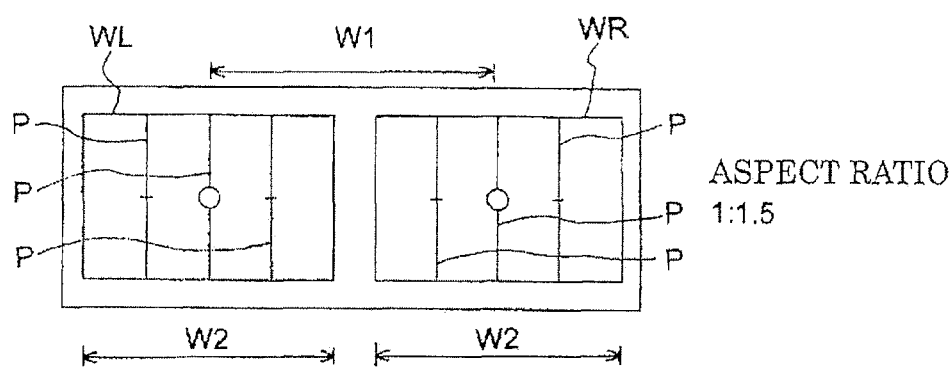
FIG. 3c  ASPECT RATIO 1:1.5
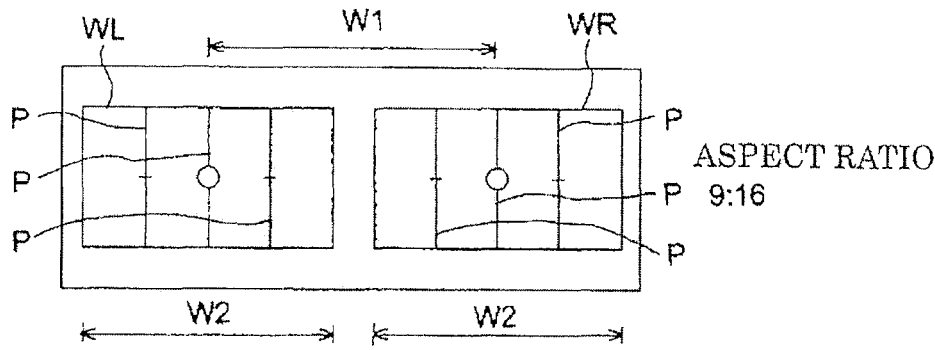
FIG. 3d  ASPECT RATIO 9:16

STEREO VIEWER AND/OR STEREO VIEW FINDER

TECHNICAL FIELD

The present invention relates to stereo viewers and/or stereo view finders, and in particular to a stereo viewer used when viewing a stereo image and/or a stereo view finder used when photographing a stereo image.

BACKGROUND ART

A stereo viewer that stereoscopically views a pair of stereo images of different viewpoints photographed at two points spaced apart from each other through a lens with both eyes of an observer, and a stereo view finder used when photographing the stereo images are conventionally known.

For such stereo viewer, a stereo viewer in which two screens and an optical viewer including a pair of lenses and being provided in a freely pivoting manner on a lower shell body by way of a crease hinge are arranged in a plastic case configured by coupling an upper shell body and the lower shell body by way of the crease hinge is known (see e.g., patent document 1).

Furthermore, for such stereo view finder, for example, a stereo view finder attached to a lower side of an imaging unit serving as an electronic device such as a digital stereo camera, and the like to separately observe a pair of left and right TFT color liquid crystal displays arranged in a body with a pair of left and right eye lenses is known (see e.g., patent document 2).

PRIOR ART REFERENCES

Patent Documents

Patent document 1: Japanese Patent Publication No. 10-500493
Patent document 2: Japanese Unexamined Patent Publication No. 2006-303832

DISCLOSURE OF THE INVENTION

Problems to be Solved by the Invention

However, in the stereo viewer described above, the optical lens becomes large, and when viewing an electronic display such as the digital stereo camera and the like, a focal length of the optical lens becomes long and hence the lens needs to be spaced apart from the electronic display, which enlarges an outer shape. Furthermore, when viewing the stereo image outside, a luminance of the electronic display relatively lowers due to the influence of outside light and the stereo image becomes difficult to visualize.

Furthermore, in the stereo view finder described above, the body tends to become large, and hence the portability of when photographing the stereo image outside is poor.

The technical problems that need to be solved to enable the stereo image displayed on the electronic display to be easily visualized and to enhance portability so as to be easily and conveniently carried when photographing and viewing the stereo image outside arise, where the present invention aims to solve such problems.

Means for Solving the Problems

The present invention is proposed to achieve the object described above, where the invention described in an embodiment provides a stereo viewer and/or a stereo view finder used in an electronic device equipped with an electronic display for displaying a pair of stereo images, the stereo viewer and/or the stereo view finder including a foldable light shielding hood attached on the electronic display; and a magnifying lens including a pair of lenses for viewing the stereo image, the magnifying lens being attached to an inner wall surface of the light shielding hood by way of a hinge and being developable to be parallel to the electronic display.

According to such configuration, when photographing and viewing the stereo image outside, the light shielding hood prevents the outside light from entering the electronic display, and thus the stereo image displayed on the electronic display can be easily visualized, and furthermore, since the light shielding hood can be compactly folded and stored, it can be easily and conveniently carried outside.

The invention described in another embodiment provides, in addition to the configuration of the shared structure of the stereo viewer and/or the stereo view finder according to a first embodiment, the stereo viewer and/or the stereo view finder that further includes a magnifying lens raising/lowering mechanism capable of raising/lowering the magnifying lens in a perpendicular direction perpendicular to the electronic display.

According to such configuration the magnifying lens can be moved farther away from or closer to the electronic display, the diopter of the magnifying lens can be adjusted according to the visibility degree of the observer.

The invention described in another embodiment provides, in addition to the configuration of the shared structure of the stereo viewer and/or the stereo view finder according to a prior embodiment, the stereo viewer and/or the stereo view finder in which the magnifying lens raising/lowering mechanism can raise/lower the magnifying lens to an upper side in the perpendicular direction than the light shielding hood.

According to such configuration, the distance between the magnifying lens and the electronic display is ensured to be longer than the height of the light shielding hood, and hence the diopter of the magnifying lens can be adjusted according to the visibility degree of the observer regardless of the height of the light shielding hood.

The invention described in another embodiment provides, in addition to the configuration of the shared structure of the stereo viewer and/or the stereo view finder according to prior embodiments, the stereo viewer and/or the stereo view finder in which the magnifying lens raising/lowering mechanism includes a column coupled to the magnifying lens by way of a hinge, and attached to the inner wall surface of the light shielding hood so as to be raised/lowered in the perpendicular direction; a worm screw attached to a side of the column, the worm screw being turnable about a rotation axis extending in the perpendicular direction; and an input gear arranged to gear with the worm screw, the input gear turning the worm screw to raise/lower the column.

According to such configuration, the column is raised/lowered in the perpendicular direction through the worm screw, and the magnifying lens is moved farther away from or closer to the electronic display by simply turning the input gear, and hence the diopter can be easily adjusted according to the visibility degree of the photographer.

The invention described in anther embodiment provides, in addition to the configuration of the shared structure of the stereo viewer and/or the stereo view finder according to a prior embodiment, the stereo viewer and/or the stereo view finder in which a raising/lowering stopper that inhibits the gearing of the worm screw and the input gear is arranged in a tooth groove of the input gear.

According to such configuration, as the stopper is interposed between the worm screw and the input gear, the turning of the worm screw is restrained, and the column and the magnifying lens are positioned, and hence the diopter can be adjusted according to the visibility degree of the observer and the position of the magnifying lens with respect to the electronic display can be fixed.

The invention described in another embodiment provides, in addition to the configuration of the shared structure of the stereo viewer and/or the stereo view finder according to a prior embodiment, the stereo viewer and/or the stereo view finder that further includes a partition plate bridged between the inner wall surface of the light shielding hood and an opposing wall surface opposing the inner wall surface, the partition plate partitioning a view field of the pair of lenses.

According to such configuration, the angular view field of the pair of lenses is partitioned by the partition plate, and thus the observer can easily stereoscopically view the pair of stereo images.

The invention described in an embodiment provides, in addition to the configuration of the shared structure of the stereo viewer and/or the stereo view finder according to a prior embodiment, the stereo viewer and/or the stereo view finder in which the partition plate has one end attached to a back inner wall surface of the light shielding hood by way of a hinge to turn about a rotation axis perpendicular to the electronic display.

According to such configuration, the partition plate can be opened/closed according to the development and the storage of the light shielding hood.

The invention described in another embodiment provides, in addition to the configuration of the shared structure of the stereo viewer and/or the stereo view finder according to a prior embodiment, the stereo viewer and/or the stereo view finder that further includes a turning stopper that integrally fixes the partition plate to the light shielding hood and regulates the turning of the partition plate when the light shielding hood is folded, and that separates the partition plate and the light shielding hood when the light shielding hood is developed.

According to such configuration, the partition plate can be suppressed from accidentally developing when storing the light shielding hood, and the partition plate can be easily developed when developing the light shielding hood.

The invention described in another embodiment provides, in addition to the configuration of the shared structure of the stereo viewer and/or the stereo view finder according to a prior embodiment, the stereo viewer and/or the stereo view finder in which the turning stopper includes a hook portion, arranged to be slidable in an insertion hole formed in the opposing wall surface of the light shielding hood, to hook the other end of the partition plate.

According to such configuration, the partition plate can be separated from the opposing wall surface by simply sliding the stopper.

The invention described in another embodiment provides, in addition to the configuration of the shared structure of the stereo viewer and/or the stereo view finder according to a prior embodiment, the stereo viewer and/or the stereo view finder that further includes an inter-lens distance adjustment mechanism that adjusts an inter-lens distance between the pair of lenses.

According to the configuration, the inter-lens distance between the pair of lenses can be adjusted according to the eye interval of the observer.

The invention described in another embodiment provides, in addition to the configuration of the shared structure of the stereo viewer and/or the stereo view finder according to a prior embodiment, the stereo viewer and/or the stereo view finder in which the inter-lens distance adjustment mechanism includes a pair of lens holders that turnably accommodate the lenses, respectively, about the rotation axis perpendicular to the electronic display.

According to such configuration, the inter-lens distance between the pair of lenses can be adjusted according to the eye width of the observer by turning the lens holder about the rotation axis.

The invention described in another embodiment provides, in addition to the configuration of the shared structure of the stereo viewer and/or the stereo view finder according to a prior embodiment, the stereo viewer and/or the stereo view finder in which the inter-lens distance adjustment mechanism includes a segment gear formed on respective opposing surfaces of the pair of lens holders to gear with each other.

According to such configuration, the segment gears gear with each other when the pair of lens holders are turned, so that one lens holder cooperatively operates with the turning operation of the other lens holder and the work load involved in the adjustment of the inter-lens distance can be alleviated.

The invention described in another embodiment provides, in addition to the configuration of the shared structure of the stereo viewer and/or the stereo view finder according to a prior embodiment, the stereo viewer and/or the stereo view finder in which the inter-lens distance adjustment mechanism includes an excessive turning stopper that regulates an excessive turning of the lens holder.

According to such configuration, the stopper suppresses the excessive rotation of the lens holder interval, whereby the lens interval can be adjusted to within a desired range.

The invention described in another embodiment provides, in addition to the configuration of the shared structure of the stereo viewer and/or the stereo view finder according to a prior embodiment, the stereo viewer and/or the stereo view finder in which the inter-lens distance adjustment mechanism includes a base plate with holes, each being larger than the left and right lenses, the pair of left and right lens holders are installed on the base plate, and the base holder and the pair of lens holders are turnably coupled with a pin at a respective lower end as a center. A hole for arranging a camshaft in a rotatably standing manner is formed at a center of the base plate, the cam shaft having two left and right cams fixed is arranged in a standing manner in the hole, and a side end of each of the left and right lens holders is brought into contact with the left and right cams by a spring. A mechanism for adjusting an interval of the lens holders to a suitable state of an observer by the left and right cams by turning the upper end of the camshaft with a finger is provided.

According to such configuration, the interval of the left and right lenses can be adjusted by simply turning the camshaft, and the entire mechanism can be miniaturized.

The invention described in another embodiment is a stereo viewer and/or a stereo view finder of an electronic display method that is used in association with a digital stereo camera and that displays a pair of stereo images, the stereo viewer and/or the stereo view finder being a stereo viewer and/or a stereo view finder according to a prior embodiment, where a collimation pattern same on the left and right is displayed on the left and right display screens by software.

According to such configuration, when using the stereo viewer and/or the stereo view finder as a stereo view finder by being attached to the stereo camera, the left and right patterns merge to appear as one stereoscopic model, and a normal stereoscopic vision can be photographed by carrying out the photographing such that the stereoscopic vision to photograph appears on the other side of the stereoscopic model pattern.

The invention described in another embodiment is a stereo viewer and/or a stereo view finder, the stereo viewer and/or the stereo view finder being a stereo viewer and/or a stereo view finder according to a prior embodiment, where a stereo slide is inserted to a slot provided at an upper part of the electronic display to enable the stereo slide formed on a film to be viewed by white displaying the left and right electronic displays and using the displays as a backlight.

According to such configuration, the electronic display can be used as a backlight, and the film type stereo slide can be viewed even with the electronic display.

The invention described in another embodiment is a stereo viewer and/or a stereo view finder, according to a prior embodiment, where when the stereo viewer and/or the stereo view finder is attached to a stereo camera, a face coupling mechanism is provided on one side of an attachment position, and the face coupling mechanism is pressurized with a spring; and assuming number of teeth of the coupling is N excluding a number dividable by 360°/90°=4 and a derived angle is 360/N, n being an integer, a minimum number of rotation angle of n satisfied by n(360°/N)>90° is turned, an intermediate position of the turn is such that a stopper is arranged at a 90° position of actually turning the display is fixed at the position.

According to such configuration, the display, and the like do not drop by its own weight, and when lowering the display to a lower position, an operation of further turning toward a lower side than the lower position due to the effect of deriving the face coupling acts, and furthermore, when raising the display to an upper side, an operation of further turning toward an upper side than the upper position acts, so that the display is not carelessly moved in the normal state by being restrained at the position of 90° in the upper and lower range right before with the stopper.

The present invention enables the stereo image displayed on the electronic display to be easily visualized, and enables easy and convenient carrying as it can be freely folded even when used as the stereo viewer when photographing the stereo image outside. Furthermore, as the electronic display can also be used as a backlight, it can also be used as a film type stereo viewer.

BRIEF DESCRIPTION OF THE DRAWINGS

FIG. 3 is an example of displaying a pattern, same on left and right, on an electronic display with software, and is a schematic view showing the stereo image, where FIG. 3(a) is a view showing an aspect ratio of 3:4, FIG. 3(b) is a view showing an aspect ratio of 1:1.41, FIG. 3(c) is a view showing an aspect ratio of 1:1.5, and FIG. 3(d) is a view showing an aspect ratio of 9:16;

BEST MODE FOR CARRYING OUT THE INVENTION

In order to achieve the object of enabling the stereo image displayed on the electronic display to be easily visualized and to enhance the portability so as to be easily and conveniently carried when photographing and viewing a stereo image outside, the present invention provides a stereo viewer and/or a stereo view finder used in an electronic device equipped with an electronic display for displaying a pair of stereo images, the stereo viewer and/or the stereo view finder including a foldable light shielding hood attached on the electronic display; and a magnifying lens including a pair of lenses for viewing the stereo image, the magnifying lens being attached to an inner wall portion of the light shielding hood by way of a hinge and being developable to be parallel to the electronic display.

Examples

A stereo viewer/stereo view finder according to a first example of the present invention will be described below based on FIGS. 1 to 6.

Figure 1:
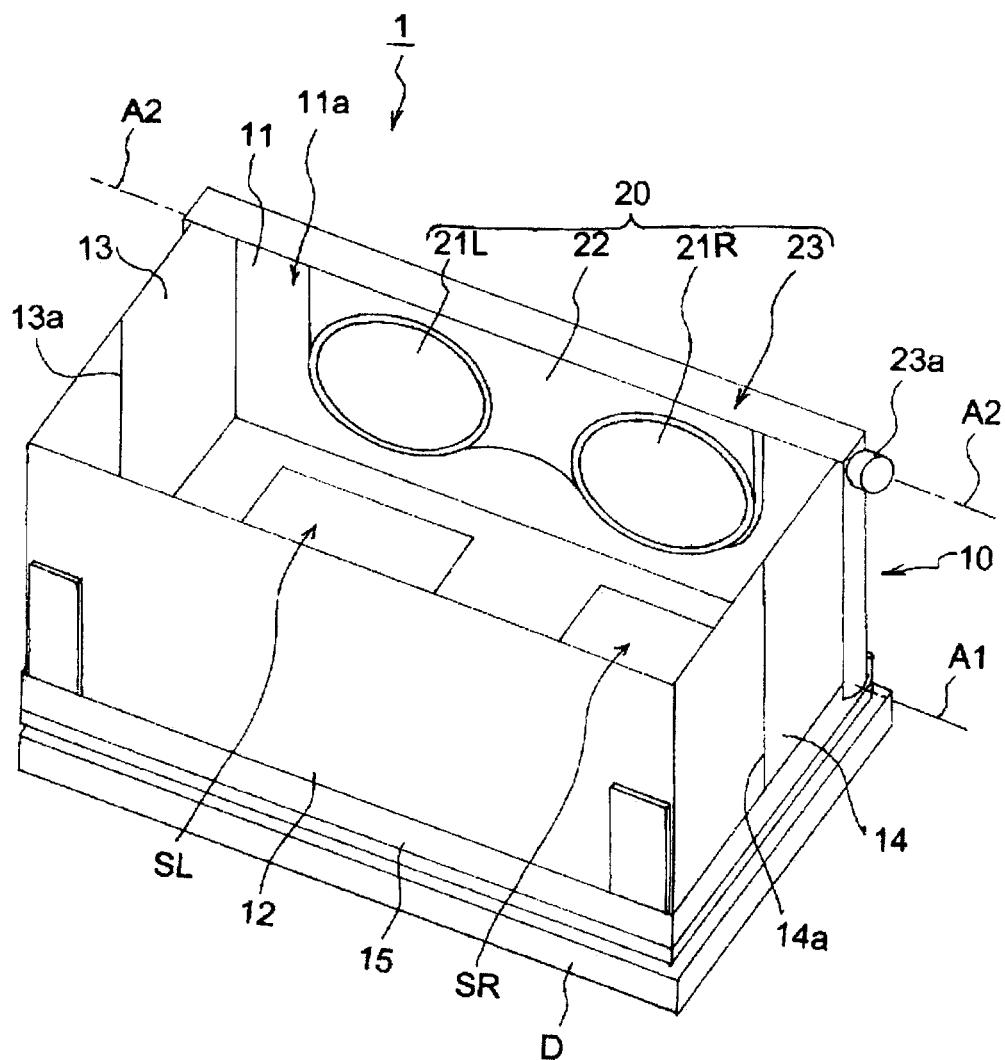
FIG. 1 is a perspective view showing a stereo viewer/stereo view finder according to a first example of the present invention.

As shown in FIG. 1, a stereo viewer/stereo view finder 1 is applied to a digital stereo camera (not illustrated) including a liquid crystal display D serving as an electronic display, and used as a viewer and a view finder. The liquid crystal display D may be an organic EL.

The digital stereo camera may include two of each of a lens and an imaging element, or may include three of each of a lens and an imaging element so that an inter-optical axis distance of the photographing lenses can be changed according to a distance with a subject.

Figure 2:
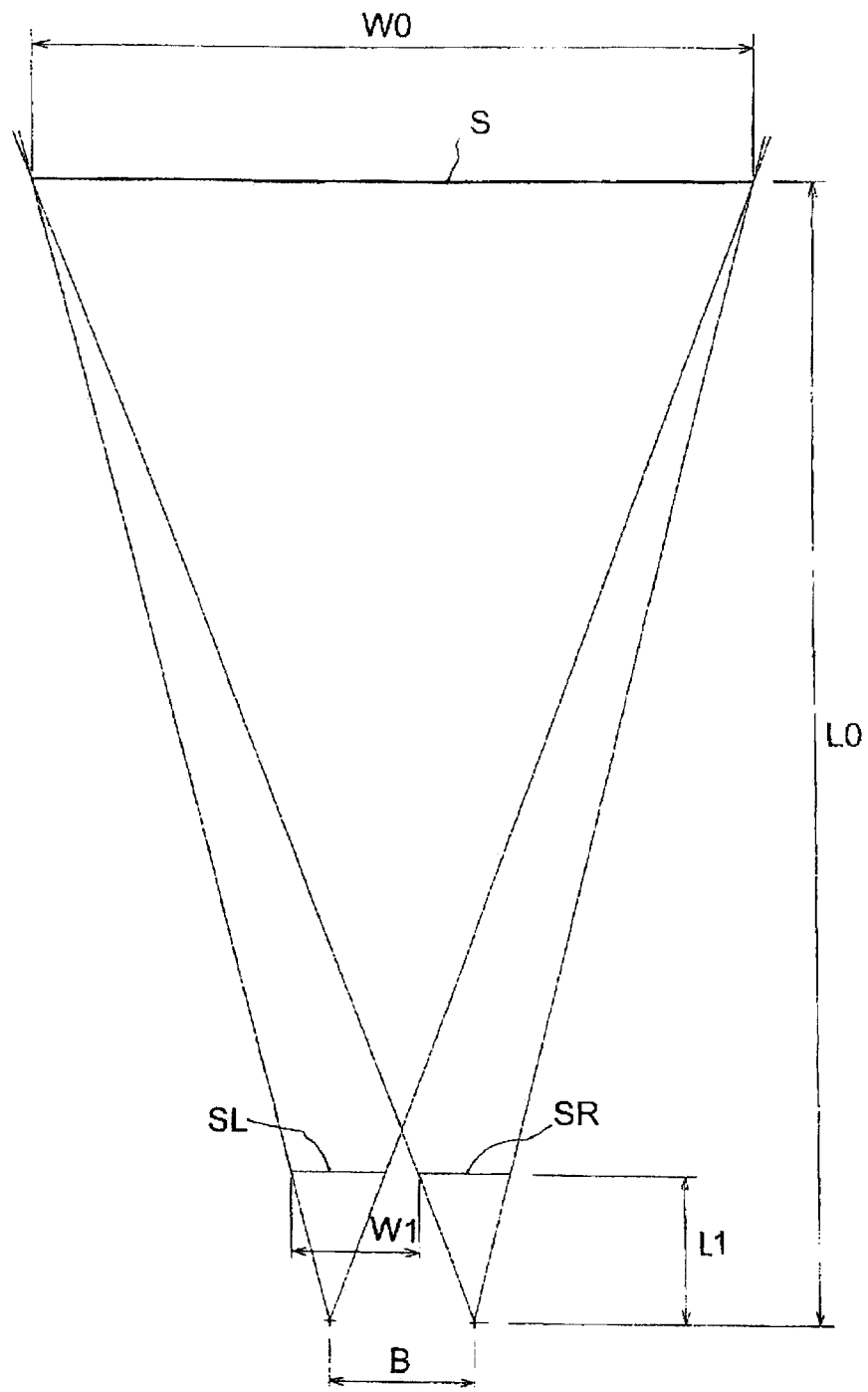
FIG. 2 is a schematic view showing a display interval of a pair of stereo images.

As shown in FIG. 2, a pair of stereo images SR, SL are displayed so as to be projected onto a reference dimension display screen S. The "reference dimension display screen S" is a position where visual fields of an observer viewing the stereo images SR, SL coincide. A display image W1 between the pair of stereo images SR, SL is set according to a relational expression W1=B(1−L1/L0), where B is an eye interval of the observer, L1 is a distance from the eye to the liquid crystal display D, and L0 is a distance from the eye of the observer to the reference dimension display screen S.

Therefore, the pair of stereo images SL, SR are to be displayed on the liquid crystal display D while being spaced apart by the display interval W1 from each other, where a pair of display windows WR, WL spaced apart by the display interval W1 from each other may be provided on the liquid crystal display D, and the stereo images SR, SL may be displayed on the display windows WR, WL, respectively, as shown in FIG. 3. For example, if the distance L0 from the eye to the reference dimension display screen S is 2500 mm, the reference dimension display screen width W0 is 1800 mm, and the width W2 of the display windows WR, WL is 55 mm, the distance L1 from the eye to the liquid crystal display D will be 76.39 mm, that is, 1800/55=32.7272 2500/32.7272=76.39 (mm).

A focal length of the lens (pair of left and right magnifying lenses) 20 of the viewer to be described later is theoretically 76.39 mm, but a focal length of 70 mm to 80 mm may be used without arising any problem. This is because the visibility degree of the user is adjusted, and further correction is sometimes required depending on the visibility degree of the user (it may be preferable for a person whose visibility degree is extremely deviated from a standard value to further use a magnifying lens of a focal length outside the above range). Assuming the eye interval B of the observer is 65 mm, the display interval W1 of the pair of stereo images SR, SL becomes W1=B(1−L1/L0)=65 (1−76.39/2500)=63.01 mm according to the relational expression described above.

Furthermore, a collimation pattern P may be arbitrarily displayed in a manner superimposed on the stereo images SR, SL in the display windows WR, WL. A composition of a subject thus can be easily checked during photographing and after photographing. When used as a finder of a stereo camera, a distance at which a stereoscopic model of the collimation pattern P can be viewed is the position where the left and right visual fields coincide, and hence the stereoview can be seen at the distance of 2500 mm.

However, 2500 mm is a set value, and this is not the only case. When photographing a stereo picture, the photographing should be carried out such that the stereoscopic model of the subject can be seen on the other side of the collimation pattern. If the stereoscopic model of the subject is seen on the near side than the stereoscopic model of the collimation pattern, the collimation pattern may be seen in a doubly shifted manner. Even if the stereoscopic model of the subject is seen on the near side than the collimation pattern, photographing can be carried out if the collimation pattern appearing at the back does not appear shifted.

Furthermore, an aspect ratio of the display windows WR, WL may be arbitrarily changed. In particular, the display interval W1 between the pair of stereo images SR, SL can be maintained constant before and after the change of the aspect ratio by changing a height H while maintaining the width W2 of the display windows SR, SL constant.

Figure 4:
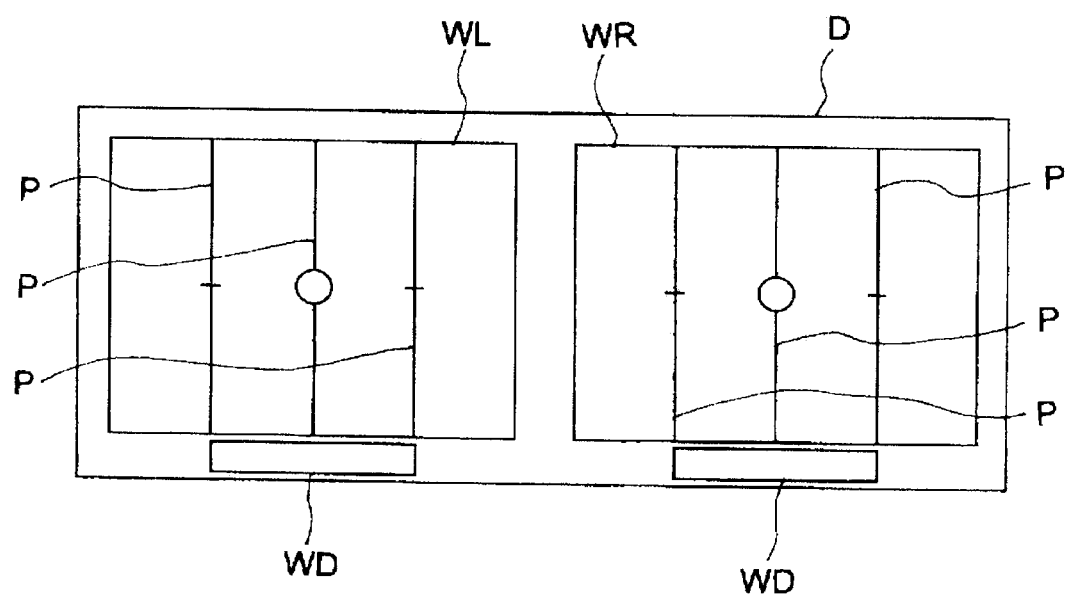
FIG. 4 is a schematic view showing a state in which photographing information is displayed on the electronic display.

Furthermore, as shown in FIG. 4, a data display window WD for displaying photograph data such as a resolution and edit data of the stereo images SR, SL displayed during photographing and after photographing is preferably displayed in a region excluding the display windows WR, WL in the liquid crystal display DS. The photograph data or the edit data is thus avoided from being displayed in a manner superimposed on the stereo images SR, SL, and the stereo images SR, SL can be more easily viewed.

The collimation pattern displayed on the left and right screens is necessary by any means, but as this may feel bothersome (depends on preference of photographer), it may be displayed only when attached to the camera and photographed as the stereo view finder, may be ON/OFF switch displayed with a push button, and the like, or may be displayed with a timer for a few seconds only when the shutter button is half pushed. Furthermore, the collimation pattern may be displayed for examination when used as the stereo viewer. Generally, however, it is preferred that the collimation pattern is displayed at the time of photographing, and not displayed when being used as the stereo viewer.

Next, a structure of the stereo viewer/stereo view finder according to the present example will be described based on FIG. 1. The stereo viewer/stereo view finder 1 includes a light shielding hood 10 attached on the liquid crystal display D, and a pair of magnifying lenses 20 that can be developed to be parallel to the liquid crystal display D.

The light shielding hood 10 is configured by a front wall portion 11, a back wall portion 12, a left wall portion 13, and a right wall portion 14, each arranged to stand along a peripheral edge of the rectangular liquid crystal display D, and the light shielding hood 10 is foldable, as will be described later. A lower part of the front wall portion 11 is fixed to be turnable about a rotation axis A1 with respect to a hood frame 15. The left wall portion 13 is configured to be bendable toward an inner side at a central hinge 13a. The right wall portion 14 is configured to be bendable toward an inner side at a central hinge 14a.

The light shielding hood 10 may be freely detachable/attachable with respect to the liquid crystal display D, or may be integrally attached to the liquid crystal display D.

The magnifying lens 20 includes a pair of lenses 21R, 21L, and a lens holder 22 for accommodating the pair of lenses 21R, 21L, respectively.

The pair of lenses 21R, 21L are arranged in the lens holder 22 such that an inter-optical axis distance of the lenses 21R, 21L becomes equal to the eye interval B (e.g., 65 mm) of a general observer.

The lens holder 22 is attached to a front inner wall surface 11a of the light shielding hood 10 by way of a hinge 23, and is able to turn 90° about a rotation axis A2 of the hinge 23. The magnifying lens 20 can be developed to be substantially parallel to the liquid crystal display D by lifting up the lens holder 22 approximately 90° from the front inner wall surface 11a. A reference symbol 23a in FIG. 1 indicates a grip for turning the lens holder 22.

Figure 5:
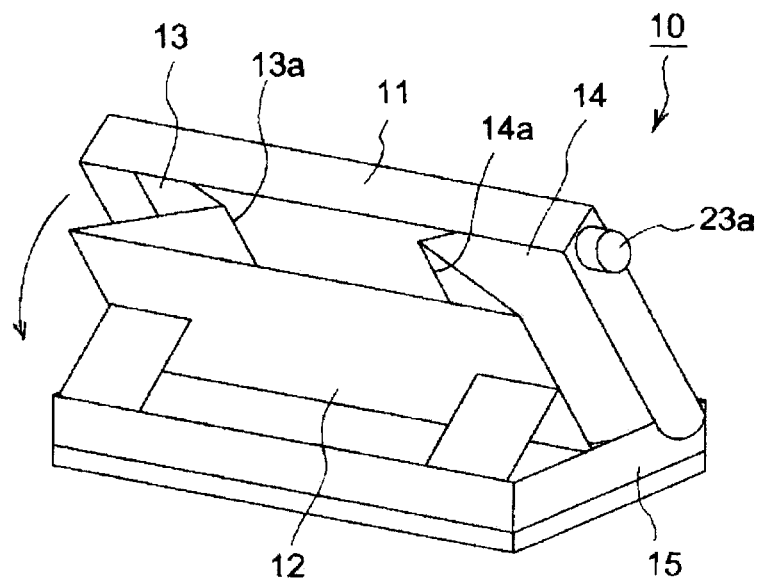
FIG. 5 is a perspective view showing a state in which a light shielding hood is being folded.
Figure 6:
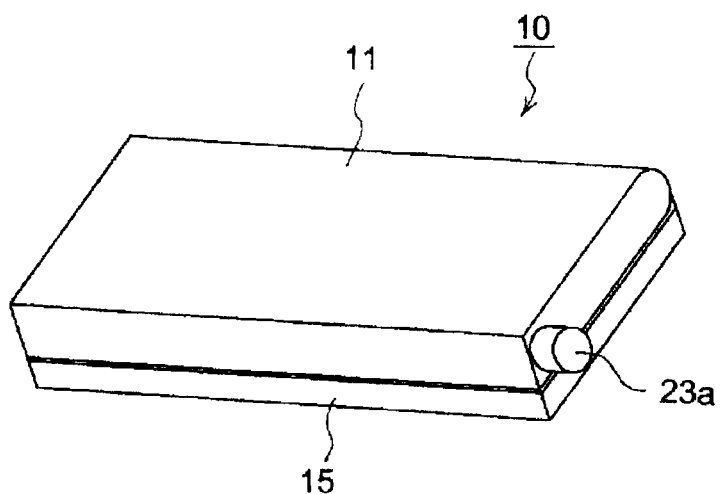
FIG. 6 is a perspective view showing a state in which the light shielding hood is folded.

Now, a procedure for folding the light shielding hood 10 will be described based on FIGS. 5 and 6. In FIGS. 5 and 6, the magnifying lens 20 is omitted.

As shown in FIG. 5, the light shielding hood 10 can be compactly folded by folding the left wall portion 13 and the right wall portion 14 in substantially half, respectively, and folding the front wall portion 11 toward the inner side while sliding the back wall portion 12 toward the front wall portion 11 on the hood frame 15.

Furthermore, as shown in FIG. 6, when unfolding the light shielding hood 10, the left wall portion 13 and the right wall portion 14 can be opened by a biasing force of a torsion coil spring (not illustrated) installed at the central hinges 14a, 15a by simply lifting up the front wall portion 11, so that the light shielding hood 10 can be easily and conveniently developed.

As described above, in the stereo viewer/stereo view finder 1 according to the present example, the light shielding hood 10 prevents the outside light from entering the liquid crystal display D when photographing or viewing the stereo image outside, so that the stereo images SR, SL displayed on the liquid crystal display D can be easily visualized. Furthermore, when the hood is stored, the light shielding hood 10 is compactly small, and can be easily and conveniently carried around.

Now, a stereo viewer/stereo view finder according to a second example of the present invention will be described based on FIG. 7. A redundant description on a configuration common between the stereo viewer/stereo view finder according to the present example and the stereo viewer/stereo view finder according to the first example described above will be omitted.

The stereo viewer/stereo view finder 1 includes a magnifying lens raising/lowering mechanism X that can raise/lower the magnifying lens 20 in a perpendicular direction V perpendicular with respect to the liquid crystal display D.

The magnifying lens raising/lowering mechanism X includes a column 16 fitted into a slit 11b having a horseshoe shaped cross-section formed along the perpendicular direction V at the center of the front inner wall surface 11a, a worm screw 17 extended along the perpendicular direction V at a side end 16a of the column 16, and an input gear 18 that gears with the worm screw 17.

The column 16 is connected to the magnifying lens 20 by way of the hinge 23. Specifically, an upper end 22a of the lens holder 22 is coupled to an upper end 16b of the column 16 by way of the hinge 23.

The column 16 is arranged independent from the front wall portion 11, and can be freely raised/lowered in the perpendicular direction V in the slit 11b and can be raised to the upper side in the perpendicular direction V than the front wall portion 11. In other words, the liquid crystal display D and the magnifying lens 20 can be spaced apart by a length (e.g., 15 mm) of a column 15 projected out to the upper side from the upper end of the front wall portion 11, in addition to a height (e.g., 50 mm) of the upper end of the front wall portion 11. The magnifying lens 20 thus can be raised at an installation distance (e.g., 65 mm) longer than the height of the light shielding hood 10.

Although "distance (e.g., 65 mm) longer than the height of the light shielding hood 10" appears to contradict "a focal length of 70 mm to 80 mm may be used without arising any problem" previously stated, actually, the distance of the object and the magnifying lens when seen through the magnifying lens becomes slightly shorter than the focal length of the magnifying lens.

A supporting arm 16c is arranged to project out toward a horizontal direction H perpendicular to the perpendicular direction V from the upper part and the lower part of the side end 16a of the column 16.

The worm screw 17 includes a worm shaft 17a turnably supported by the supporting arm 16c, and a worm 17b formed on a peripheral surface of the worm shaft 17a. The worm screw 17 is turned about the worm shaft 17a in cooperation with the turning of the input gear 18. It is raised/lowered in cooperation with the turning of the worm screw 17.

A fine adjustment knob 17c integrally attached with the worm shaft 17a, and provided to cause the worm screw 17 to turn about the worm shaft 17a is arranged at an upper end of the worm shaft 17a.

The input gear 18 is axially supported by a rotation shaft 18a arranged in a projecting manner on the front inner wall 11a. A worm wheel, a helical gear, and the like, for example, may be used for the input gear 18.

The input gear 18 includes a projecting portion 18b that projects out outward from the front wall portion 11. The observer can turn the input gear 18 about the rotation shaft 18 by way of the projecting portion 18b.

A raising/lowering stopper (not illustrated) that inhibits the gearing of the worm 17b and the input gear 18 is arranged in a tooth groove of the input gear 18. When the worm 17b gears with the tooth groove, where the raising/lowering stopper is arranged, the turning of the worm screw 17 is restrained. A reference symbol 18c refers to a marker indicating a position where the raising/lowering stopper is arranged, that is, a rotation limit position of the input gear 18.

The raising/lowering stopper merely needs to inhibit the gearing of the worm 17b and the input gear 18, and for example, may be formed by attaching a metal piece to the tooth groove and filling the tooth groove, may be formed by welding a metal piece in the tooth groove and filling the tooth groove, or may be formed by leaving one tooth groove without performing gear cutting when carrying out the gear cutting.

Now, an operation of the magnifying lens raising/lowering device for raising/lowering the magnifying lens 20 will be described based on the drawings.

When raising the magnifying lens 20, the observer turns the projecting portion 18b of the input gear 18 in a clockwise direction about the rotation shaft 18a. When lowering the magnifying lens 20, the observer turns the projecting portion 18b of the input gear 18 in a counterclockwise direction about the rotation shaft 18a. The raising/lowering of the magnifying lens 20 can be switched by changing the turning direction of the input gear 18 described above, and hence a case of raising the magnifying lens 20 will be described below.

The worm 17b and the input gear 18 are geared, and the worm screw 17 is raised upward in the perpendicular direction V in cooperation with the turning of the input gear 18.

When the column 16 is continuously raised until the distance between the magnifying lens 20 and the liquid crystal display D coincides with the focal length of the magnifying lens 20, the raising/lowering stopper is interposed between the worm 17b and the input gear 18, so that the turning of the worm screw 17 is stopped, and the column 16 and the magnifying lens 20 are positioned Therefore, the raising/lowering stopper can be arranged according to the focal length of the magnifying lens 20 and the visibility degree of the observer, so that the diopter adjustment can be easily carried out and the magnifying lens 20 can be fixed.

Furthermore, as the column 16 and the magnifying lens 20 are slightly raised/lowered by slightly turning the worm screw 17 by way of the fine adjustment knob 17c the position of the magnifying lens 20 with respect to the liquid crystal display D can be fine adjusted.

Therefore, the stereo viewer/stereo view finder 1 according to the present example can adjust the diopter of the magnifying lens 20, in addition to the effect of the stereo viewer/stereo view finder of the first example.

Figure 8:
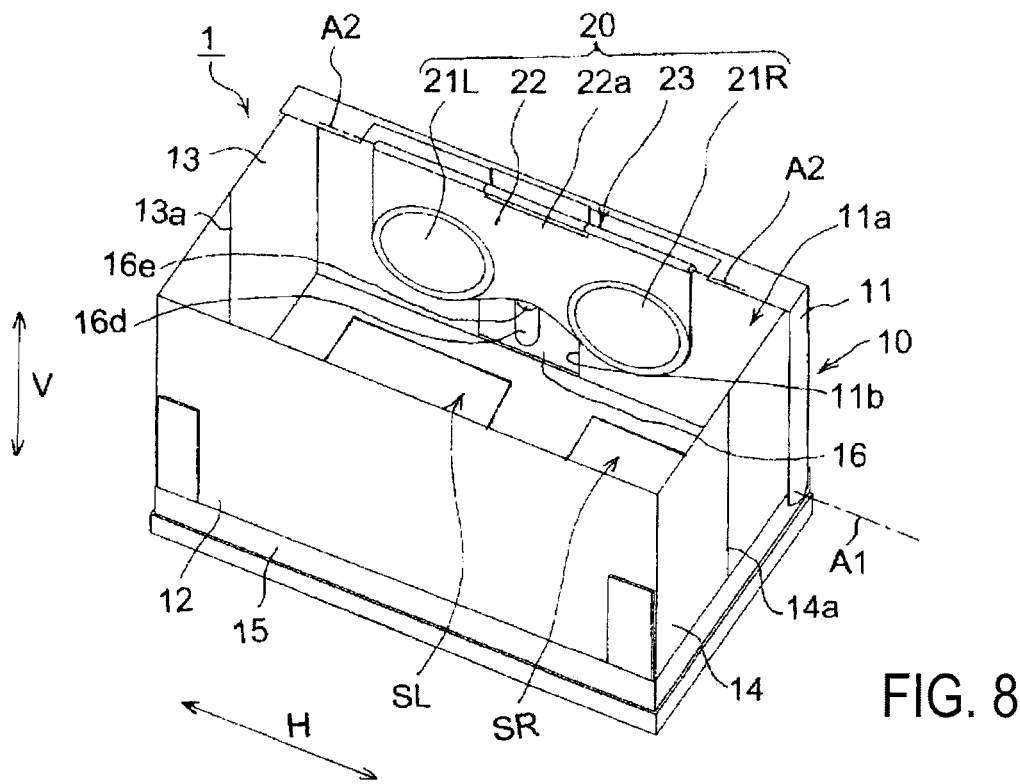
FIG. 8 is a perspective view showing a first variant of the stereo viewer/stereo view finder shown in FIG. 7.

As shown in FIG. 8, the magnifying lens raising/lowering mechanism X may be configured with the column 16, a stopper hole 16d provided at the lower part of the column 16, and a stopper pin 16e inserted into the stopper hole 16d to position the column 16 at a desired position. Thus, the column 16 can be positioned by simply inserting the stopper pin 16e into the stopper hole 16d after raising the column 16 to the desired position, whereby the magnifying lens raising/lowering mechanism X can be provided at low cost.

Figure 9:
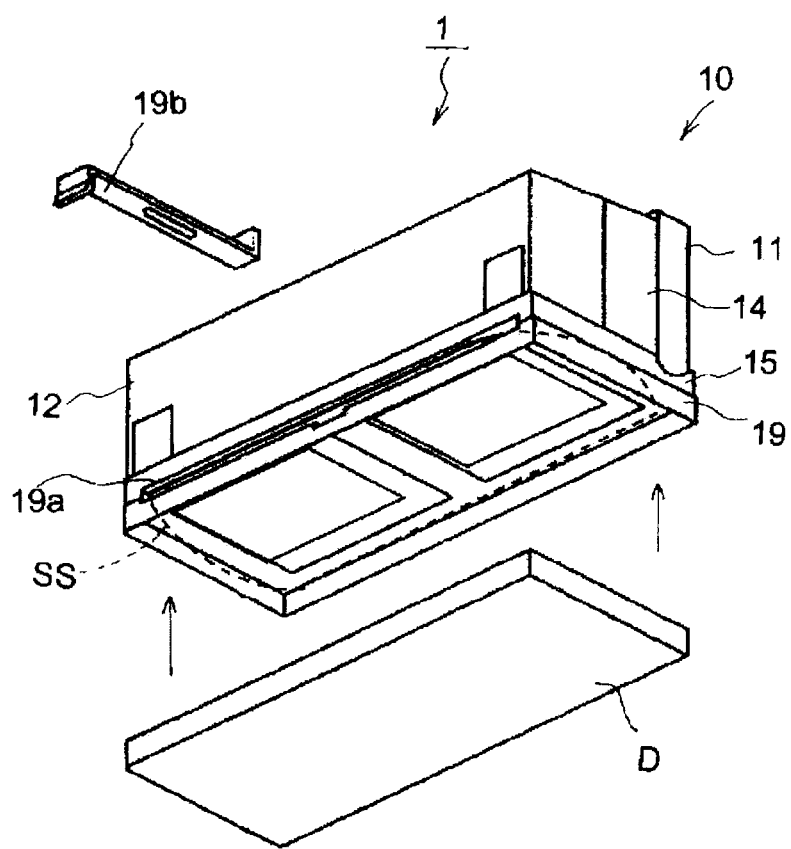
FIG. 9 is a perspective view showing a second variant of the stereo viewer/stereo view finder shown in FIG. 7.

Furthermore, as shown in FIG. 9, the light shielding hood 10 may have a slide holder 19 arranged on the lower side of the hood frame 15, where the hood frame 15 and the slide holder 19 may form a slot 19a for inserting a silver salt stereo slide SS, and the liquid crystal display D may display white as a backlight of the silver salt slide SS. The distance between the eye of the observer and the silver salt stereo slide SS is shorter than the distance between the eye of the observer and the liquid crystal display D, and thus the observer can arbitrarily select the silver stereo slide SS and the liquid crystal display D by raising/lowering the magnifying lens 20 in the perpendicular direction V to adjust the diopter.

This is one of the characteristics of the present invention. In other words, the diopter adjustment differs among individual users, and thus needs to be adjustable to different values depending on the individual users, and at the same time, for example, needs to be immediately adjusted to a constant position any time when used by the same user, where the structure shown in FIG. 7 has such elements.

Figure 7:
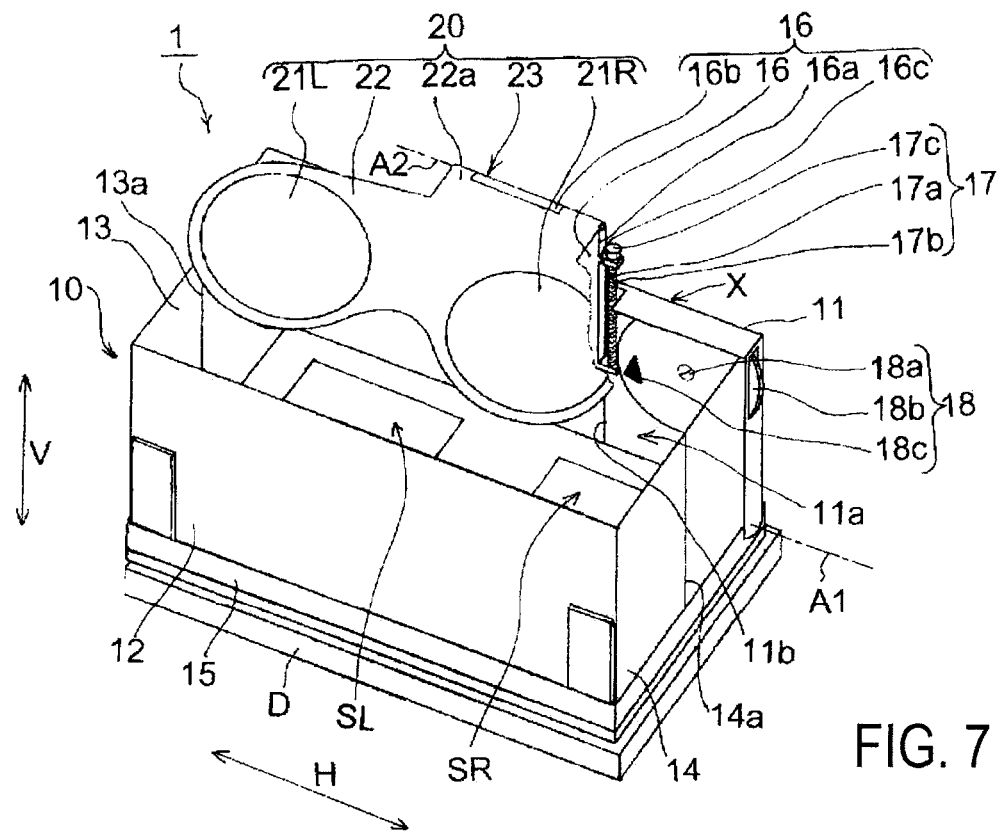
FIG. 7 is a partially cutout perspective view showing a stereo viewer/stereo view finder according to a second example of the present invention.

The focus adjustment needs to be changed for when looking at the liquid crystal display and for when looking at the silver salt stereo picture, but such adjustment can be responded by simply turning the fine adjustment knob 17c of FIG. 7.

Once adjustment is made, such adjustment position is adjusted to a constant position at the time of use. Although the illustration is omitted, for example, the adjustment position is always reproduced to the constant position by pressing the stopper against the groove and the like on the outer side of the fine adjustment knob 17c with a spring, and the like to provide a so-called click stop mechanism, or by applying resistance with respect to rotation so as not to easily rotate.

Furthermore, in FIG. 9, when inserting the silver salt stereo slide SS into the slot 19a, a discharge lever 19b for mounting the silver salt stereo slide SS may be provided. Thus, the silver salt stereo slide SS can be easily inserted and retracted. Moreover, when the liquid crystal display is white displayed to be used as a backlight, a black line between the liquid crystal pixels may stand out. If the black line stands out when looking at the silver salt stereo slide, the image quality may significantly lower.

To this end, a diffuser for scattering the light beam is inserted. The diffuser may simply be a white film-like sheet, and two of such sheets may be inserted simultaneously with the stereo slide but should be fixed through some method when viewing the stereo slide (not illustrated). The diffuser and the stereo slide are preferably spaced apart as much as possible.

Next, a stereo viewer/stereo view finder according to a third example of the present invention will be described based on FIGS. 10 and 11. A redundant description on a configuration common between the stereo viewer/stereo view finder according to the present example and the stereo viewer/stereo view finder according to the first example described above will be omitted.

The stereo viewer/stereo view finder 1 includes a partition plate 30 that partitions the visual fields of the pair of lenses 21R, 21L.

A supporting side end 30a of the partition plate 30 is attached to a back inner wall surface 12a facing the front inner wall surface 11a by way of a hinge (not illustrated), and the partition plate 30 can be turned about a rotation axis A3 perpendicular to the liquid crystal display D. Furthermore, a biasing force in a direction of developing the partition plate 30, that is, in a clockwise direction in the plane of drawing about the rotation axis A3 in FIG. 10 acts on the partition side end 30a of the partition plate 30 by a torsion coil spring (not illustrated) of the hinge.

A turning side end 30b of the partition plate 30 is hooked to a turning stopper 40 located in a state parallel to the perpendicular direction V and provided to be slidable in the horizontal direction H, and integrally fixed to the back wall portion 12 of the light shielding hood 10.

The turning stopper 40 includes an L-shaped hook portion 41 that is inserted into an insertion hole 12b formed in the back wall portion 12 of the light shielding hood 10 to hook to the turning side end 30b of the partition plate 30 at the distal end, a U-shaped spring 42 that biases the hook portion 41 from the outer side toward the inner side in the horizontal direction H, and a guide portion 43 formed to a tapered shape from the outer side toward the inner side in the horizontal direction H at the distal end of the hook portion 41.

Next, a procedure for developing the partition plate 30 will be described.

When the hook portion 41 is sled from the inner side to the outer side in the horizontal direction H within the insertion hole 12 while the magnifying lens 20 is developed parallel to the liquid crystal display D, the partition plate 30 and the hook portion 41 are unhooked, so that the partition plate 30 can turn about the rotation axis A3.

The biasing force of the torsion coil spring causes the partition plate 30 to turn until the rotation side end 30b of the partition plate 30 makes contact with a stopper pin 11c provided on the lower side of the magnifying lens 20, so that the partition plate 30 is bridged between the front inner wall surface 11a and the back inner wall surface 12a.

Next, a procedure for fixing the partition plate 30 to the back inner wall surface 12a will be described.

After the turning side end 30b of the partition plate 30 is turned up to the guide portion 43 of the turning stopper 40, the partition plate 30 slides the hook portion 41 from the inner side to the outer side in the horizontal direction H against the force of biasing the hook portion 41 from the outer side to the inner side in the horizontal direction H of the U-shaped spring 42.

When the partition plate 30 is brought close to the back inner wall surface 12a until the turning side end 30a of the partition plate 30 and the guide portion 43 of the turning stopper 40 separate, the hook portion 41 is sled from the outer side to the inner side in the horizontal direction H to hook with the turning side end 30b of the partition plate 30 by the biasing force of the U-shaped spring 42, and the partition plate 30 is fixed to the back inner wall surface 12a.

Therefore, the stereo viewer/stereo view finder 1 according to the present example can enable the pair of stereo images SR, SL to be easily stereoscopically viewed by partitioning the visual fields of the pair of stereo images SR, SL with the partition plate 30, in addition to the effect of the stereo viewer/stereo view finder 1 of the first example.

Furthermore, the partition plate 30 can be opened/closed according to the time of development and time of storage of the light shielding hood 10.

Figure 12:
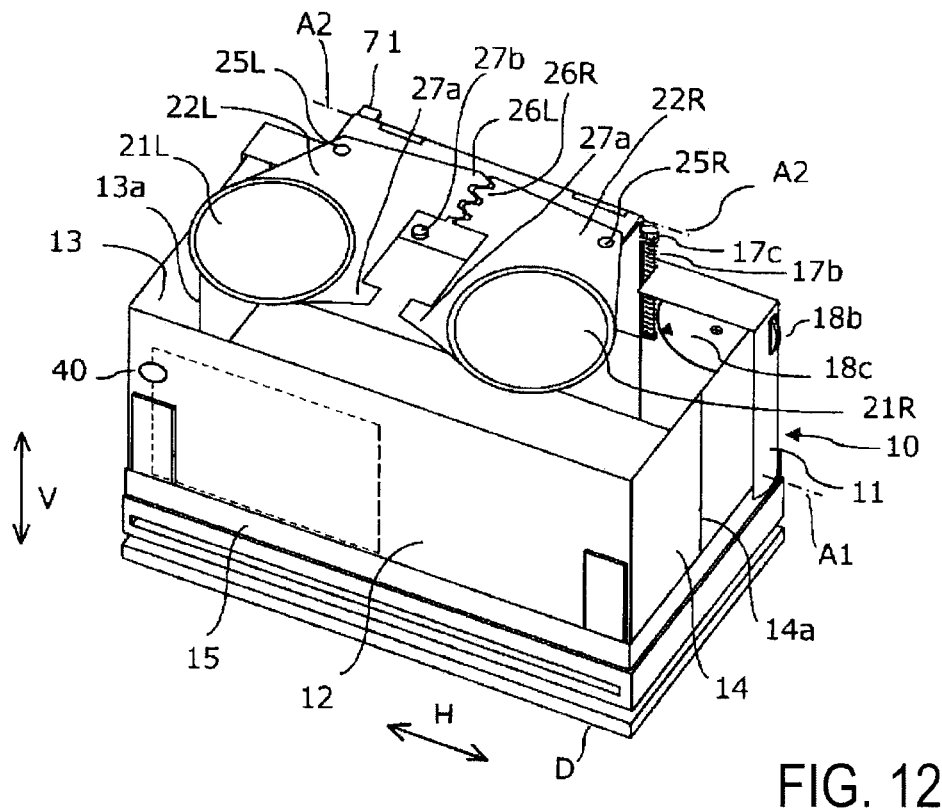
FIG. 12 is a perspective view showing a stereo viewer/stereo view finder according to a fourth example of the present invention.
Figure 13:
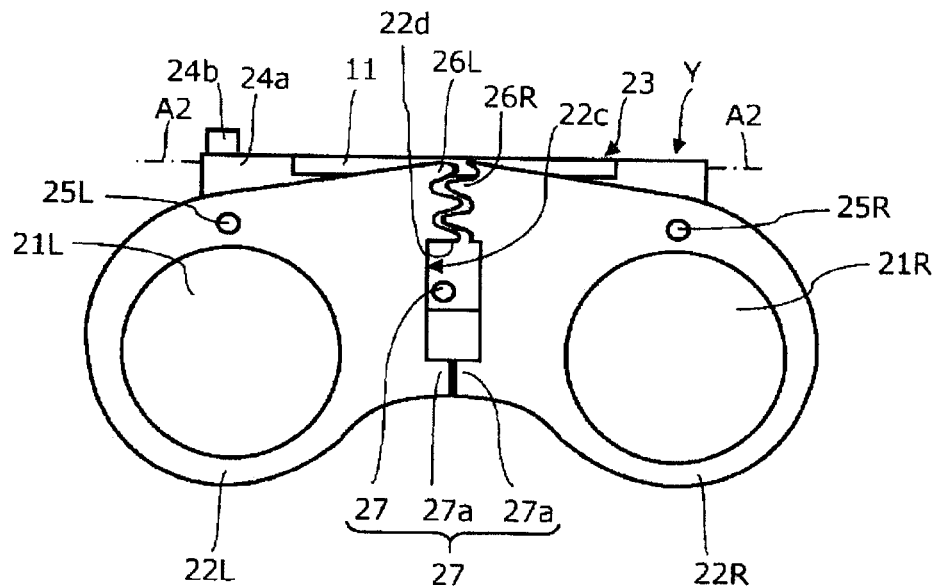
FIG. 13 is a plan view showing a magnifying lens and a lens interval distance adjustment mechanism shown in FIG. 12.

Next, a stereo viewer/stereo view finder according to a fourth example of the present invention will be described based on FIGS. 12 and 13. A redundant description on a configuration common between the stereo viewer/stereo view finder according to the present example and the stereo viewer/stereo view finder according to the first example described above will be omitted.

The magnifying lens 20 is configured by a pair of lenses 21R, 21L, a pair of lens holders 22R, 22L for accommodating the lenses 21R, 21L, respectively, and a supporting board 24 mounted with the pair of lens holders 22R, 22L and coupled to the front wall portion 11 by way of the hinge 23.

The pair of lens holders 22R, 22L are axially supported by pins 25R, 25L, respectively, arranged in a projecting manner on the supporting board 24. A distance between the pins 25R, 25L is set to 65 mm, and the inter-optical axis distance (hereinafter referred to as "inter-lens distance) of the pair of lenses 22R, 22L is usually set to 65 mm, which is equal to the distance between the pins 25R, 25L.

The pins 25R, 25L are respectively arranged on the upper side of the pair of lenses 22R, 22L. The specific arrangement positions of the pins 25R, 25L merely need to be such that the inter-lens distance can be adjusted, and may be any place, except for a line connecting the centers of the pair of lenses 22R, 22L, as long as a line connecting the pins 25R, 25L is parallel to the line connecting the centers of the lenses 22R, 22L.

An inter-lens distance adjustment mechanism Y that can adjust the inter-lens distance between the pair of lenses 21R, 21L includes the pair of lens holders 22R, 22L described above, and segment gears 26R, 26L formed at an opposing surface 22b of the pair of lens holders 22R, 22L to be able to gear with each other.

Thus, the inter-lens distance becomes narrower when the lens holders 22R, 22L are turned to bring the pair of lenses 21R, 21L closer to each other, and the inter-lens distance becomes wider when the lens holders 22R, 22L are turned to separate the pair of lenses 21R, 21L away from each other, and hence the inter-lens distance between the pair of lenses 21R, 21L can be adjusted according to an eye width of the observer.

Furthermore, as the segment gears 26R, 26L gear with each other and hence the lens holders 22R, 22L are turned in cooperation when the lens holders 22R, 22L are turned, the work load involved in the adjustment of the inter-lens distance can be alleviated.

Furthermore the inter-lens distance adjustment mechanism Y includes an excessive turning stopper 27 that regulates the excessive turning of the lens holders 22R, 22L. The excessive turning stopper 27 includes an excessive approaching stopper 27a that prevents the pair of lens holders 22R, 22L from approaching in excess, and an excessive separating stopper 27b that prevents the pair of lens holders 22R, 22L from separating in excess.

The excessive approaching stopper 27a is a projection piece arranged in a projecting manner from the opposing surface 22b at the back part of the lens holder 22R, 22L, and is integrally formed with the lens holder 22R, 22L. The excessive approaching stopper 27a is arranged such that the excessive approaching stoppers 27a make contact with each other when the inter-lens distance reaches a predetermined lower limit value (e.g., 58 mm). Specific arrangement position and length of the excessive approaching stopper 27a are arbitrarily set according to the lower limit value of the inter-lens distance.

The excessive separating stopper 27b is a pin arranged in a cutout portion 22c, in which one part of the opposing surface 22b of the lens holder 22R, 22L is cut out to a rectangular shape, and arranged in a standing manner on the supporting board. The excessive separating stopper 27b is arranged such that the excessive separating stopper 27b makes contact with an inner peripheral surface 22d of the cutout portion 22c when a lens interval reaches a predetermined upper limit value (e.g., 72 mm). The arrangement position and the size of the excessive separating stopper 27b are arbitrarily set according to the upper limit value of the inter-lens distance.

Thus, the excessive rotation stopper 27 suppresses the excessive turning of the lens holders 22R, 22L, whereby the inter-lens distance between the pair of lenses 21R, 21L can be smoothly adjusted within a desired range.

Therefore, the stereo viewer/stereo view finder 1 according to the present example can adjust the inter-lens distance according to the eye interval of the observer, in addition to the effect of the stereo viewer/stereo view finder of the first example.

A fifth example will now be described. A pair of left and right lens units 50 shown in FIGS. 14a, 14b, and 14c is a different embodiment from that of the stereo viewer/stereo view finder 1 shown in FIG. 12, where the display D, the light shielding hood 10, the column 16, and the like other than the lens unit are portions common with FIG. 12.

Figure 14A:
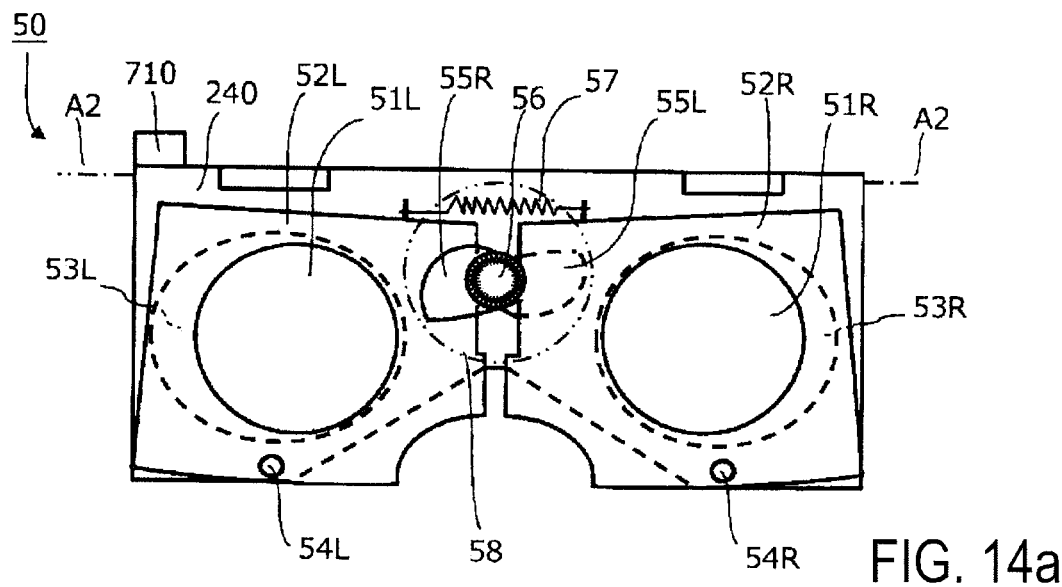
FIG. 14a is an explanatory view showing another embodiment of the stereo viewer/stereo view finder.
Figure 14B:
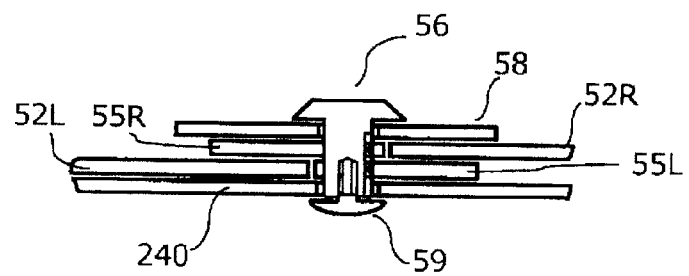
FIG. 14b is an explanatory view showing another embodiment of the stereo viewer/stereo view finder.
Figure 14C:
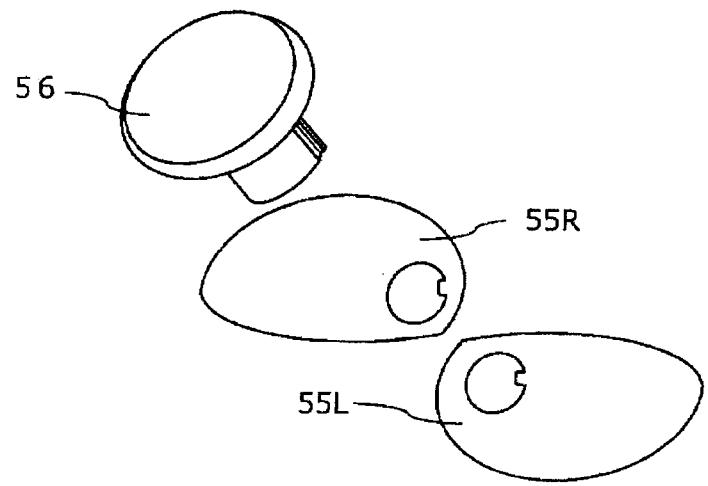
FIG. 14c is an explanatory view showing another embodiment of the stereo viewer/stereo view finder.

The lens unit 50 shown in FIG. 14a has a base plate 240 attached in a state turnable by 90° with respect to the display D at the lower part. At left and right lower parts of the base plate 240, holes (no reference symbol) of pins 54R, 54L of the left and right supporting points for attaching and swiveling lens holders 52R, 52L, to be described later, are formed. Furthermore, a portion of overlapping the lens 51R, 51L is formed with a hole 53R, 52L greater than the lens so as not to interfere even when the lens holder 52R, 52L is swiveled.

In other words, on the base plate 240, the left and right lens holders 52R, 52L are attached in a freely turning manner with the respective pins 54R, 54L as the center by the left and right pins 54R, 54L. The left and right lens holders 52R, 52L are applied with force in a direction of approaching each other by a spring 57.

Furthermore, a camshaft 56 is inserted with respect to a hole (no reference symbol) formed in the base plate at an intermediate part in the left and right direction of the left and right lens holders 52R, 52L, where a cam 55R and a cam 55L are attached to the camshaft 56, and the interval of the left and right lenses 51R, 51L is eventually adjusted by turning the head of the camshaft 56 with the finger.

FIG. 14b is a partial cross-sectional view having the camshaft 56 as the center, and shows a state in which the cam 55R pushes an end face of the lens holder 52R and shows a state in which the cam 55L pushes the lens holder 52L. The cams 55R, 55L are actually extremely thin of about 1 mm, and preferably attached with a washer 58 of FIG. 14b to prevent uplifting. The washer 58 may be press fitted to the shaft and rotated together.

FIG. 14c is an example showing an assembled state of the camshaft 56, and the cams 55R, 55L, where a key groove for maintaining the position in the rotating direction of the cam 55R and the cam 55L with respect to the camshaft 56 is formed in the camshaft 56. Two key grooves may be provided, but it is advantageous to provide one groove since accurate derivation is required to provide the two grooves, and furthermore, since the groove needs to be formed through machining even with respect to a small shaft and hence requires a great work.

Since the outer shape and the hole of the cams 55R and 55L are punched out with a press (thickness of around 1 mm), problems barely arise even if the position of the portion to be fitted to the key groove is opposite to each other between 55R and 55L with respect to the hole. Furthermore, although the outer shapes of the cams 55R and 55L seem to be as if the same cam is merely rotated 180°, the end faces of the lens holder 52R and the lens holder 52L do not become parallel, and thus the cam of the same profile cannot be used due to the change in the contact angle, whereby two types of cams need to be created.

Furthermore, the movement amount of the left and right lenses may not be completely the same in the interval adjustment of the left and right lenses. In this case, the same cam can be used for the left and the right cams.

The left and right cams produce a step difference between the left and the right in the thickness direction. Thus, a step difference also needs to be formed in the lens holders 52R and 52L that make contact with the cams 55R, 55L, but the end face of either the left or the right lens holder 55 merely needs to be folded to the position of the cam to be on the upper side as the thickness of the lens holder 55 is about 1 mm and the thickness of the cam is also about 1 mm.

Figure 15:
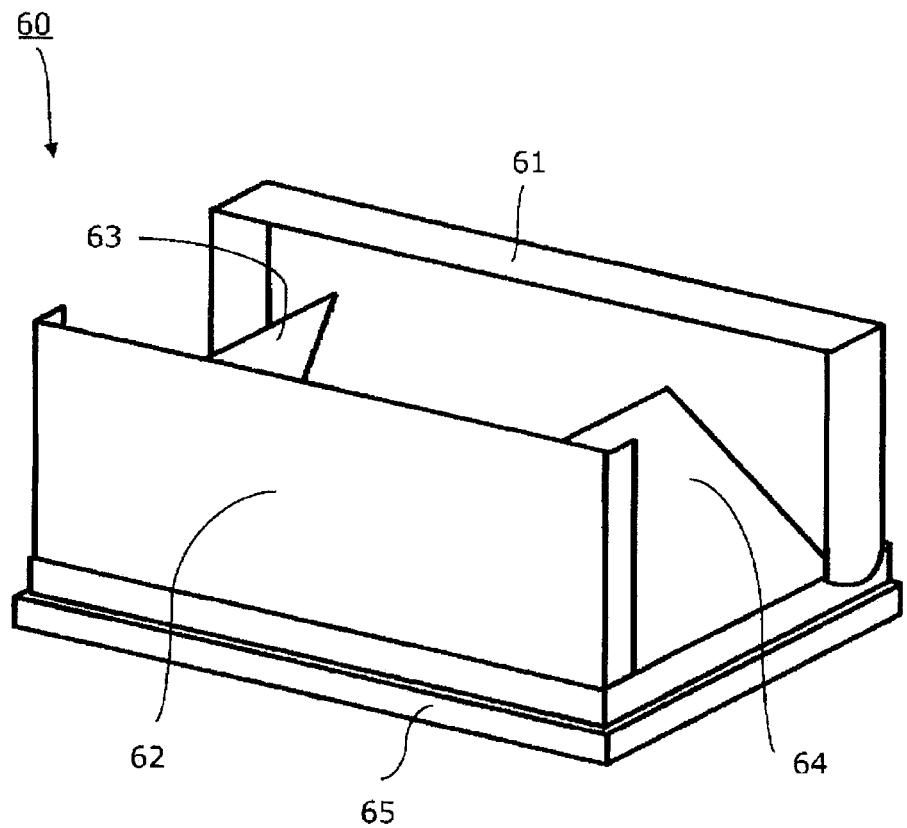
FIG. 15 is a perspective view of a light shielding hood of another mode.

Furthermore, a light shielding hood 60, illustrated in FIG. 15, used in a normal camera is also used. When folding the light shielding hood 60, left and right side walls 63, 64 are folded in any left and right order, and thereafter, a back side wall 67 is folded, and lastly, a front side wall 61 is folded. Although the light shielding hood 60 is slightly difficult to use, the cost is inexpensive and thus is economically advantageous.

A light shielding hood shown in FIG. 15 is another example, and cannot be opened/closed through a one-touch operation, as opposed to the light shielding hood shown in FIGS. 5 and 6. When opening the light shielding hood of FIG. 15, a front lid 61 is first opened, and then a back lid 62 is opened, and thereafter, lateral lid 63 or 64 is opened in any order. Furthermore, when closing the illustrated light shielding hood, the lateral lid 63 or 64 is sequentially closed, and thereafter, the back lid 62 is closed, and the front lid 61 is closed, in the order opposite to the order for opening. Thus, the opening/closing is more troublesome than the light shielding hood shown in FIG. 5, but the design is easier and the manufacturing cost is lower.

Figure 10:
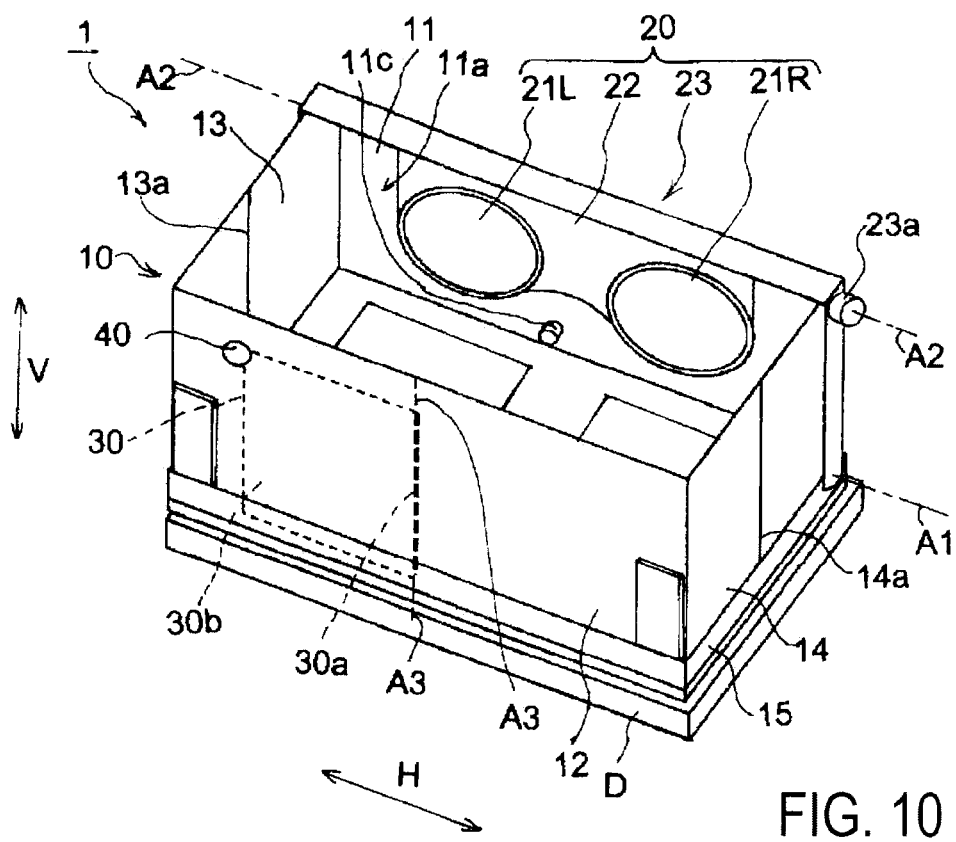
FIG. 10 is a perspective view showing a stereo viewer/stereo view finder according to a third example of the present invention.
Figure 11:
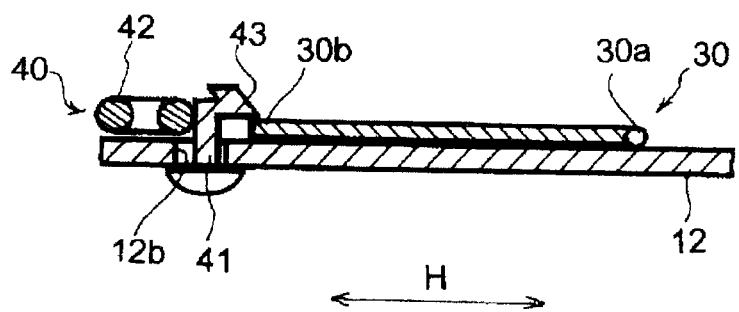
FIG. 11 is an enlarged cross-sectional view of a main part of a partition plate and a stopper shown in FIG. 10.
Figure 16:
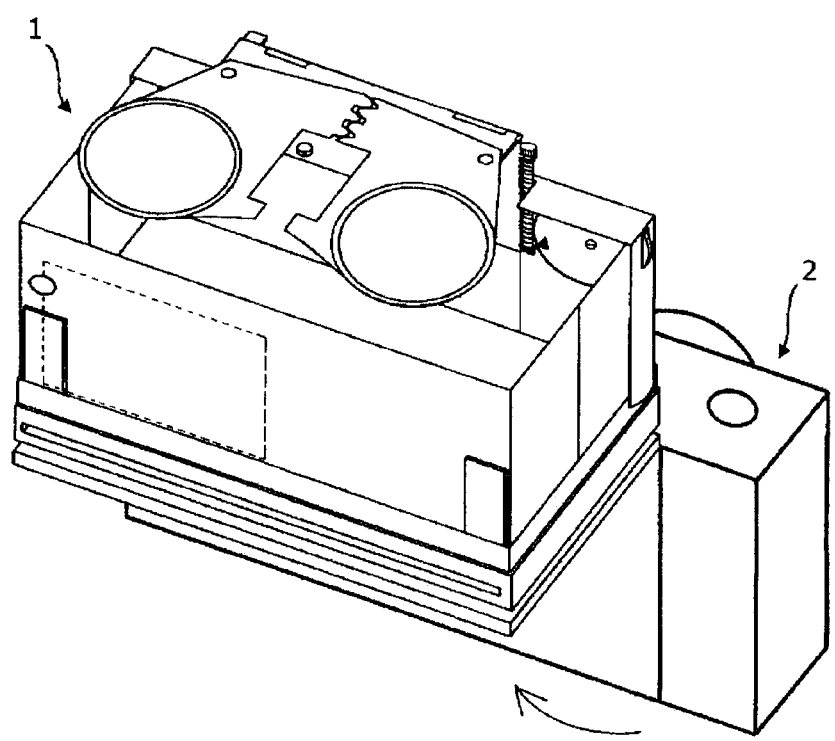
FIG. 16 is a perspective view showing a state in which the stereo view finder is attached to the stereo camera.

Although the illustration is omitted, with respect to the illustrated light shielding hood of FIG. 15, would be applied to the magnifying lens 20 of FIG. 1 and the display (pattern) shown in FIG. 3, the second example shown in FIG. 2, the third example of FIG. 10, and the stereo camera 2 is constructed. FIG. 16 is a view of when the stereo view finder 1 is used by being attached to the stereo camera 2, where the display has a structure of being turnable by 90° toward the upper side, and the illustration shows a case in which the display is turned 90° in the direction of the arrow.

Figure 17A:
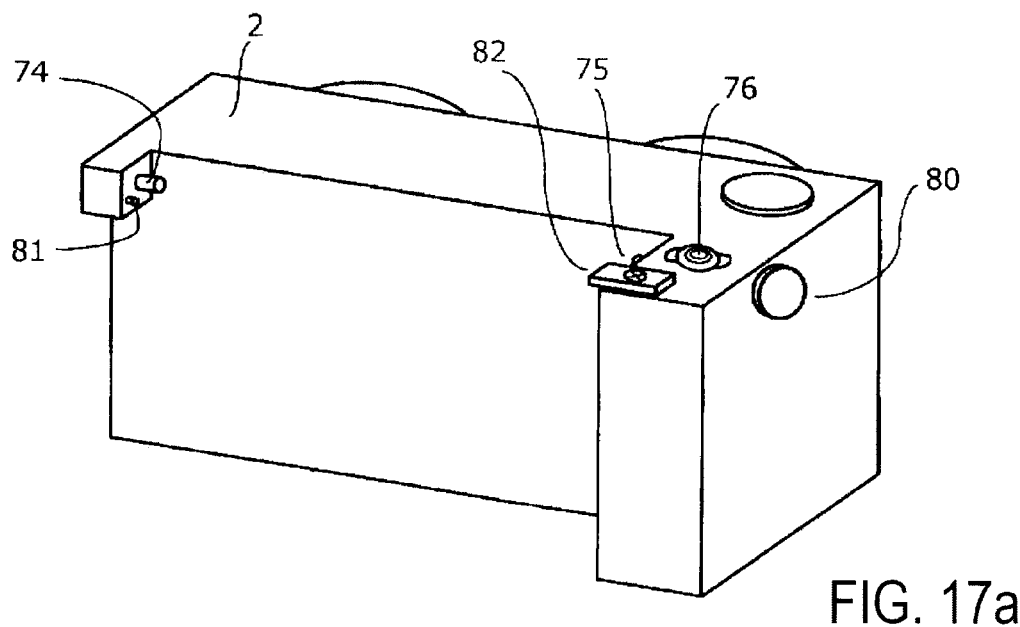
FIG. 17a is a perspective view showing a state in which the stereo view finder is attached to the stereo camera.

FIG. 17 is an example of a structure for attaching the stereo view finder 1 to the stereo camera 2, where holes 72 and 73 provided in the display are assumed as attachment holes. The hole 73 provided in the display is simply provided at the side of the display, but the hole 72 is provided at the center of a face coupling 78 (may be hole of face coupling). The attachment can be made by simply sandwiching the holes 72 and 73 with the pins 74 and 75 provided on the camera side.

A screw 80 needs to have the length adjusted so as to provide a slightly more gap than a maximum length of when the distal end of the screw is rotated by the face couplings 77 and 78 when fastened. Only the screw 80 may be required for attachment, but pressurization with the coil spring 79 is required to exhibit a click action effect. Furthermore, as the pin 75 jumps out from a pin moving hole 83 due to the coil spring 79, such jump out is prevented with a pin moving component 76, but such pin moving component 76 does not, at the same time, have a clue as to moving the pin 75 backward when the pin 75 is moved forward by the coil spring 79 when actually detaching the stereo view finder 1 from the stereo camera 2.

Thus the pin moving component 76 is also required. The screw 80 is not necessary only for the action. However, if the pin moving component 76 is moved by an accident, the stereo view finder 1 instantly drops off from the stereo camera 2. The screw 80 is essentially necessary to prevent such drop off.

Figure 17B:
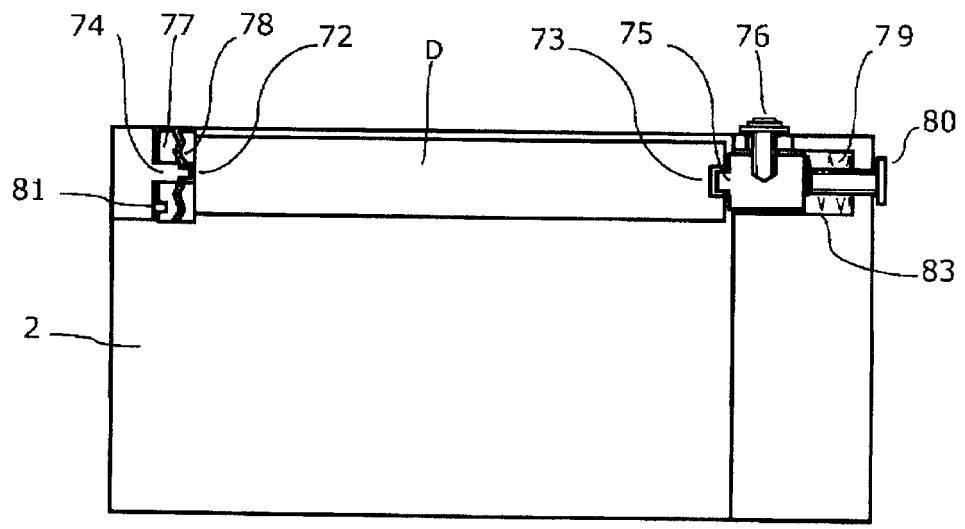
FIG. 17b is a cross-sectional view showing the state in which the stereo view finder is attached to the stereo camera.

Moreover, the coupling 77 is press fitted to the pin 74 provided on the camera side (in FIG. 17b, "step" is given to the cross-sectional shape, but this is for illustration representation, and such step may be omitted). The position in the rotating direction is positioned by a coupling positioning pin. At this time, the coupling 78 on the display side is integrally molded, and positioned in advance. The distal end of the pin 74 provided on the camera side and the hole of the coupling 78 are in a loose fitted state, and thus can be easily attached even in a slightly tilted state. Thus, the distal end of the pin 75 can be moved backward than the left end face of the pin moving hole 83 and hence the display D can be attached by loosening the screw 80 and moving the pin moving screw 76 in the rightward direction.

Furthermore, the face couplings 77 and 78 are arranged so that the display D and the light shielding hood 1 do not drop by gravity, and the like. The coil spring 79 always acts on the face coupling mechanism by way of the pin 75. Moreover, camera main body 2 and the display D serve as a stopper in the lower limit direction of turning, where the limit value in the upward direction is the position opened by 90° (not limited to 90°), and the stopper 82 acts on such limit position. As the face couplings 77, 78 act and attempt to turn by greater than or equal to 90°, the turning is limited by the stopper in the up and down direction, and the display can be prevented from being carelessly turned (swiveled) at the time of storage, and the like.

Although the illustration is omitted, a removable memory may be arranged on the display side or is to be formed to a connectable structure in view of being detached from the camera and being used as a stereo viewer. Furthermore, it may be configured such that a battery or an external power supply can be used, and a display driving mechanism is to be arranged on the stereo viewer side (display side).

An electronic device applied with a structure used for both the stereo viewer and the stereo view finder according to the present invention may be any device as long as it is equipped with an electronic display capable of displaying the stereo image, and may be, for example, a portable telephone, a digital camera, or an image generating device.

The present invention can be variously modified within a scope not deviating from the spirit of the present invention, and it should be apparent that the present invention includes such modifications.

DESCRIPTION OF SYMBOLS 1 stereo viewer/stereo view finder
2 stereo camera 10 light shielding hood
11 front wall portion
11a front inner wall portion
11b slit
11c stopper pin
12 back wall portion
12a back inner wall portion
12b insertion hole
13 left wall portion
14 right wall portion
15 hood frame
16 column
16a side end
16b upper end
16c supporting arm
16d stopper hole
16e stopper pin
17 worm screw
17a worm shaft
17b worm
17c fine adjustment knob
18 input gear
18a input shaft
18b projecting portion
18c marker (indicating position of raising/lowering stopper)
19 slide holder
19a slot
19b discharge lever
20 magnifying lens
21L, 21R pair of lenses
22 lens holder
22a upper end
22b opposing surface
22c cutout portion
22d inner peripheral surface
23 hinge
24 supporting board
25 pin
26 segment gear
27 excessive turning stopper
27a excessive approaching stopper
27b excessive separating stopper
30 partition plate
30a supporting side end (one end)
30b turning side end (other end)
40 turning stopper
41 hook portion
42 U-shaped spring
43 guide portion
50 lens unit
51L, 51R pair of lenses
52L, 52R pair of lens holders
53L, 53R pair of holes in base plate
54L, 54R pin
55R, 55L pair of cams
56 camshaft
57 spring
58 washer
59 stop screw
60 light shielding hood
61 front side wall
62 back side wall
63 side wall
64 side wall
65 hood frame
71 grip for raising lens unit
72 hole formed in display
73 hole formed in display
74 pin provided on camera side
75 pin provided on camera side
76 pin moving component
77 face coupling
78 face coupling
79 coil spring
80 screw
81 coupling positioning pin
82 stopper
83 pin moving hole
710 grip for raising lens unit
P collimation pattern
D liquid crystal display
SR, SL pair of stereo images
240 base plate
SS stereo slide

What is claimed is:

1. A stereo viewer and/or a stereo view finder used in an electronic device equipped with an electronic display for displaying a pair of stereo images, the stereo viewer and/or the stereo view finder comprising:
a foldable light shielding hood attached on the electronic display, said foldable light shielding hood having a front wall portion;
a magnifying lens including a pair of lenses for viewing the stereo image, the magnifying lens being attached to an inner wall surface of the light shielding hood by way of a first hinge and being developable to be parallel to the electronic display; and
wherein the front wall portion of the light shielding hood is provided turnably around a shaft center of a second hinge, and when said foldable light shielding hood is closed, the front wall portion covers the electronic display and the pair of lenses, and said light shielding hood is accommodated on the electronic display by folding without projecting outside of the electronic display.

2. The stereo viewer and/or the stereo view finder according to claim 1, further comprising a magnifying lens raising/lowering mechanism capable of raising/lowering the magnifying lens in a perpendicular direction perpendicular to the electronic display.

3. The stereo viewer and/or the stereo view finder according to claim 2, wherein the magnifying lens raising/lowering mechanism raises/lowers the magnifying lens to an upper side in the perpendicular direction than the light shielding hood.

4. The stereo viewer and/or the stereo view finder according to claim 1, further comprising a partition plate bridged between the inner wall surface of the light shielding hood and an opposing wall surface opposing the inner wall surface, the partition plate partitioning a view field of the pair of lenses.

5. The stereo viewer and/or the stereo view finder according to claim 4, wherein the partition plate has one end attached to a back inner wall surface of the light shielding hood by way of a hinge to turn about a rotation axis perpendicular to the electronic display.

6. The stereo viewer and/or the stereo view finder according to claim 5, further comprising a turning stopper that integrally fixes the partition plate to the light shielding hood and regulates the turning of the partition plate when the light shielding hood is folded, and that separates the partition plate and the light shielding hood when the light shielding hood is developed.

7. The stereo viewer and/or the stereo view finder according to claim 1, further comprising an inter-lens distance adjustment mechanism that adjusts an inter-lens distance between the pair of lenses.

8. The stereo viewer and/or the stereo view finder according to claim 7, wherein the inter-lens distance adjustment mechanism includes a pair of lens holders that turnably accommodate the lenses, respectively, about the rotation axis perpendicular to the electronic display.

9. The stereo viewer and/or the stereo view finder according to claim 8, wherein the inter-lens distance adjustment mechanism includes a segment gear formed on respective opposing surfaces of the pair of lens holders to gear with each other.

10. The stereo viewer and/or the stereo view finder according to claim 8, wherein the inter-lens distance adjustment mechanism includes an excessive turning stopper that regulates an excessive turning of the lens holder.

11. The stereo viewer and/or the stereo view finder according to claim 8, wherein the inter-lens distance adjustment mechanism comprising;
   a base plate having holes that are larger than the left and right lenses,
   a pair of left and right lens holders that are installed on the base plate,
   a camshaft that is arranged in a standing manner in a hole formed at a center of the base plate, and fixed two left and right cams,
   a spring that is brought the left and right lens holders into contact with the each corresponding cams,
   the base plate and the pair of lens holders are turnably coupled with a pin at a respective lower end as a center,
   when the camshaft is turned, the left and right lens holders are turned symmetrically interposing a cam plate therebetween, so, an interval of the lens holders are adjustable.

12. The stereo viewer and/or the stereo view finder according to claim 1, wherein a collimation pattern same on the left and right is displayed on the left and right display screens by software.

13. The stereo viewer and/or the stereo view finder according to claim 1, wherein a stereo slide is inserted to a slot provided at an upper part of the electronic display to enable the stereo slide formed on a film to be viewed by white displaying the left and right electronic displays and using the displays as a backlight.

14. A stereo viewer and/or a stereo view finder used in an electronic device equipped with an electronic display for displaying a pair of stereo images, the stereo viewer and/or the stereo view finder comprising:
   a foldable light shielding hood attached on the electronic display;
   a magnifying lens including a pair of lenses for viewing the stereo image, the magnifying lens being attached to an inner wall surface of the light shielding hood by way of a hinge and being developable to be parallel to the electronic display;
   a magnifying lens raising/lowering mechanism capable of raising/lowering the magnifying lens in a perpendicular direction perpendicular to the electronic display; and
   wherein the magnifying lens raising/lowering mechanism includes,
   a column coupled to the magnifying lens by way of a hinge, and attached to the inner wall surface of the light shielding hood to be raised/lowered in the perpendicular direction;
   a worm screw attached to a side of the column, the worm screw being turnable about a rotation axis extending in the perpendicular direction; and
   an input gear arranged to gear with the worm screw, the input gear turning the worm screw to raise/lower the column.

15. The stereo viewer and/or the stereo view finder according to claim 14, wherein a raising/lowering stopper that inhibits the gearing of the worm screw and the input gear is arranged in a tooth groove of the input gear.

16. A stereo viewer and/or the stereo view finder used in an electronic device equipped with an electronic display for displaying a pair of stereo images, the stereo viewer and/or the stereo view finder comprising:
   a foldable light shielding hood attached on the electronic display, said foldable light shielding hood having a front wall portion;
   a magnifying lens including a pair of lenses for viewing the stereo image, the magnifying lens being attached to an inner wall surface of the light shielding hood by way of a first hinge and being developable to be parallel to the electronic display;
   wherein the front wall portion of the light shielding hood is provided turnably around a shaft center of a second hinge, and when said foldable light shielding hood is closed, the front wall portion becomes an upper lid;
   a partition plate bridged between the inner wall surface of the light shielding hood and an opposing wall surface opposing the inner wall surface, the partition plate partitioning a view field of the pair of lenses;
   wherein the partition plate has one end attached to a back inner wall surface of the light shielding hood by way of a hinge to turn about a rotation axis perpendicular to the electronic display;
   a turning stopper that integrally fixes the partition plate to the light shielding hood and regulates the turning of the partition plate when the light shielding hood is folded, and that separates the partition plate and the light shielding hood when the light shielding hood is developed; and
   wherein the turning stopper includes a hook portion, arranged to be slidable in an insertion hole formed in the opposing wall surface of the light shielding hood, to hook the other end of the partition plate.

17. A stereo viewer and/or a stereo view finder used in an electronic device equipped with an electronic display for displaying a pair of stereo images, the stereo viewer and/or the stereo view finder comprising:
   a foldable light shielding hood attached on the electronic display;
   a magnifying lens including a pair of lenses for viewing the stereo image, the magnifying lens being attached to an inner wall surface of the light shielding hood by way of a hinge and being developable to be parallel to the electronic display; and
   wherein when the stereo viewer and/or the stereo view finder is attached to a stereo camera, a face coupling mechanism is provided on one side of an attachment position, and the face coupling mechanism is pressurized with a spring; and assuming number of teeth of the face coupling mechanism is N excluding a number dividable by $360°/90°=4$ and a derived angle is $360/N$, n being an integer, a minimum number of rotation angle of n satisfied by $n(360°/N)>90°$ is turned, an intermediate position of the turn is such that a stopper is arranged at a 90° position of actually turning the display is fixed at the position.

18. A stereo viewer and/or a stereo view finder used in an electronic device equipped with an electronic display for displaying a pair of stereo images, the stereo viewer and/or the stereo view finder comprising: a light shielding hood having a front wall portion with a front wall top edge, an opposing front wall bottom edge, a front wall left edge, and an opposing front wall right edge; a lens holder hinged to the front wall top edge of the front wall portion, wherein said lens holder is configured to fold adjacent to the front wall; a hood frame holding the electronic display, said hood frame having a front frame edge, an opposing back frame edge, a frame left edge, and an opposing frame right edge; a back wall having a back wall bottom edge, a back wall left edge, and an opposing back wall right edge; a left side wall having an intermediate left hinge, said left side wall extending between the front wall left edge and the back wall left edge; a right side wall having an intermediate right hinge, said right side wall extending between the front wall right edge and the back wall right edge; the intermediate left hinge and the intermediate right hinge configured so that the intermediate left hinge and the intermediate right hinge move toward each other inward towards said lens holder; a front hinge attaching the front wall bottom edge of said light shielding hood to the front frame edge of said hood frame configured so that said light shielding hood folds adjacent said hood frame; and wherein the back wall bottom edge of said back wall is configured to freely move towards said front hinge as said light shielding hood rotates on said front hinge towards said hood frame, whereby said back wall and said light shielding hood fold over and adjacent said hood frame.

\* \* \* \* \*